(12) United States Patent
Lomax

(10) Patent No.: US 7,699,074 B2
(45) Date of Patent: Apr. 20, 2010

(54) VALVE ASSEMBLY INCLUDING FIRST AND SECOND JOINED PARTS

(75) Inventor: Stuart Andrew Lomax, West Yorkshire (GB)

(73) Assignee: Xamol Ltd., Yorkshire (GB)

( * ) Notice: Subject to any disclaimer, the term of this patent is extended or adjusted under 35 U.S.C. 154(b) by 1025 days.

(21) Appl. No.: 10/523,297

(22) PCT Filed: Apr. 28, 2004

(86) PCT No.: PCT/GB2004/001807

§ 371 (c)(1),
(2), (4) Date: Jul. 21, 2005

(87) PCT Pub. No.: WO2004/097275

PCT Pub. Date: Nov. 11, 2004

(65) Prior Publication Data

US 2006/0048825 A1    Mar. 9, 2006

(30) Foreign Application Priority Data

Apr. 29, 2003  (GB) .................................. 0309660.9

(51) Int. Cl.
*G05D 16/06*  (2006.01)
*F16L 29/00*  (2006.01)

(52) U.S. Cl. .................................. 137/614.01; 137/613
(58) Field of Classification Search .................. 137/613, 137/614, 614.01, 614.02, 614.03
See application file for complete search history.

(56) References Cited

U.S. PATENT DOCUMENTS

| 4,890,643 | A | | 1/1990 | Oliver |
| 5,482,253 | A | * | 1/1996 | Klyde ..................... 251/315.07 |
| 6,182,696 | B1 | * | 2/2001 | Rainwater et al. ............ 137/613 |
| 6,220,290 | B1 | * | 4/2001 | Lomax ......................... 137/613 |
| 6,830,069 | B2 | * | 12/2004 | Shillito et al. ................ 137/613 |

FOREIGN PATENT DOCUMENTS

| EP | 10 038 132 B1 | 1/2002 |
| GB | 2 274 317 A | 7/1994 |
| WO | WO 02/29303 A1 | 4/2002 |

* cited by examiner

*Primary Examiner*—Kevin L Lee
(74) *Attorney, Agent, or Firm*—Woodard, Emhardt, Moriarty, McNett & Henry LLP

(57) ABSTRACT

A double block and bleed valve assembly having a valve body with a bore. The bore has an opened and closed position by two valve arrangements to control fluid flow along a pipeline.

13 Claims, 3 Drawing Sheets

VALVE ASSEMBLY INCLUDING FIRST AND SECOND JOINED PARTS

CROSS-REFERENCE TO RELATED APPLICATIONS

The present application is the national stage of International Patent Application PCT/GB2004/001807, filed Apr. 28, 2004 (which was published in English), which claims the benefit British Patent Application No. 0309660.9, dated Apr. 29, 2003, all of which are hereby incorporated by reference.

BACKGROUND OF THE INVENTION

1. Field of the Invention

The invention to which this application relates is to a valve assembly and particularly to improvements in the design of a valve assembly commonly known as a double block and bleed valve.

2. Description of the Prior Art

The use of the double block and bleed valve assembly is well known and is extensively used in pipelines such as those used for carrying oil supply. The use of double block and bleed valves is generally regarded as the best option in terms of safety and ease of maintenance. The valves typically, although not exclusively, include two trunnion mounted balls wherein the respective seals of each valve are moved onto the ball within the valve body to bring about the sealing or closure of the valve. A problem which is general to all double block and bleed valves is that the length of the same is required to comply with the International. Standard ANSI B16.10. This acts as a restriction on the design possibilities for the valves and can be troublesome to valve manufacturers in having to ensure that the valve components can be accommodated in the valve body whilst ensuring that the length restrictions can still be achieved.

One known form of double block and bleed valve is disclosed in the applicant's patent EP1038132. This form of valve has been found to be extremely successful commercially due to the advantages in practical usage. Reference to this patent and Prior art FIG. 1 illustrates one form of double block and bleed valve arrangement with the valve body formed by two parts joined together at an interface intermediate the ends of the valve body. At each end of the body are provided flange formations X,Y to allow the valve to be attached to the pipeline flanges via bolts. This valve also has the significant advantage of only having a single joint i.e at the interface. This is of advantage over the "double retainer" form of valves which have two pressurized joints instead of just one. As a result it can reasonably be stated that the valve in accordance with the patent is 50% safer.

Another recent development reveals a valve arrangement in which, rather than the valve body being formed from two parts joined at an interface intermediate the ends of the valve body, the valve body is a unitary member having a bore along the length thereof and the body is connected directly to the pipeline without flanges on the valve. However in this arrangement, due to the unitary nature of the valve body, the valve components are required to be inserted into the bore from one end of the body and locked therein by the insertion of a sealing ring into the end of the bore. The sealing ring is held in that position, typically by a threaded arrangement or other locking means. A problem with this arrangement is that there is a significant risk of leakage of the liquid or gas passing through the bore, through a passage defined between the sealing ring and the bore in the valve body.

A problem with both of these known arrangements is the need to provide, as part of the valve assembly, the flange formations X,Y as illustrated in FIG. 1. This therefore means that the part Z in which the valve components is provided is limited in size and therefore makes the assembly of the valve difficult and confines the components and features which can be incorporated into the valve.

The aim of the present invention is to provide an improvement to a double block and bleed valve assembly which allows additional space to be provided for the location of the valve components within the valve body while at the same time ensuring that the valve still meets the criteria of ANSI 16.10 in terms of the length of the same and that fluid leakage is still prevented or minimised.

SUMMARY OF THE INVENTION

In a first aspect of the invention there is provided a valve assembly, the assembly comprising a valve body having a bore running along the length thereof, the bore controlled between open and closed positions by two selectively operable valve arrangements positioned within the body, the body formed from at least first and second valve body parts, the parts joined at an interface intermediate the ends of the valve body and characterized in that the valve body further includes, at least one end thereof, at least one port, the at least one port having an opening at an end face of the valve body and the port depending inwardly from the end face into the valve body for the reception of a locating means to allow the valve to be joined with a pipeline end at the end face.

In one embodiment a plurality of spaced ports are provided, each provided for the reception of a locating means. Typically the locating means is a bolt.

Typically the valve assembly is a double block and bleed valve assembly.

Typically the series of ports are provided at first and second opposing end faces of the valve body to allow the location of the first and second end faces of the valve body with first and second pipeline ends respectively.

Typically the ports are blind ports in that their length is shorter than the length of the valve body part in which the same is located.

Typically the valve body parts are joined at the interface to form the valve body by means of bolts passing though a series of spaced, matching, channels. Typically the interface lies perpendicular to the longitudinal axis of the bore passing through the valve body.

Typically the location of and spacing between the ports at the end of the valve body is such that the same are offset with respect to the locations of the channels which receive the bolts for joining the valve body parts together at the interface intermediate the ends of the valve body.

Typically a bleed valve is mounted on one of the two parts of the valve body. The interface between the valve body parts is typically formed so as to minimise the risk of leakage of the liquid or gas from the bore through the interface to atmosphere. Typically the join is in accordance with that described in the applicant's patent referred to previously In one embodiment eight ports are provided at each end of the valve body to allow the valve body to be connected to the adjacent end of a pipeline, each port equally spaced around a circular path adjacent the periphery of the valve body end face.

In whichever embodiment of the invention, the valve body has a length which matches the required length in accordance with ANSI 16.10.

In a further aspect of the invention there is provided a double block and bleed valve assembly for connection to first and second pipeline ends, said pipeline ends provided with a flange with apertures at spaced locations for the reception of location means which pass through said apertures and into spaced ports provided in the respective ends of the valve body and wherein the valve assembly body is of substantially the same outer surface dimensions along the length thereof.

As the ports are provided within the valve body rather than as part of a flange formation, so in this invention, there is no need to provide the flange formation at either end of the valve assembly. This therefore means that the valve body can be provided along the entire length of the valve assembly and can be of substantially the same shape and dimensions from end face to end face of the valve assembly. This therefore means that the capacity of the interior of the valve body is increased. This is in contrast to the prior art arrangements which do require the provision of flange formations for joining with the matching flanges at the pipeline ends.

In one embodiment the outer dimension of the valve body is similar to the outer dimension of the pipeline flange.

In one aspect of the invention the double block and bleed valve assembly comprises a valve body having a bore running along the length thereof, said bore movable between open and closed positions by two selectively operable valve arrangements positioned in line along the bore within the valve body, said body formed from first and second parts, said parts joined at an interface intermediate the ends of the valve body and wherein the valve body further includes at at least one end thereof, a series of spaced ports, said ports depending inwardly from the end face and provided for the reception of location means to pass through the matching respective apertures provided on a pipeline flange and said ports located wholly within the valve body to allow the valve to be directly joined with said pipeline via contact between the end face of the valve body and the pipeline flange.

In a further aspect of the invention there is provided a pipeline assembly incorporating a pipeline with at least one double block and bleed valve assembly fitted thereto, said assembly comprising a valve body having a bore running along the length thereof, said bore controlled between open and closed position by two selectively operable valve arrangements positioned along the bore to allow the selective flow of a fluid along the said pipeline and valve bore when the valve is open, and characterised in that the valve body includes at the end faces which are joined to the pipeline ends, a series of spaced ports, each of said ports having an opening at the end face of the valve body and depending inwardly from the end face into the valve body for the reception of a locating bolt which pass through an aperture provided in a flange at the pipeline end and into the port in the valve body to allow the valve to be joined with a pipeline end.

In one embodiment the valve body is formed from two body parts, said parts joined at an interface intermediate the end faces of the valve body.

BRIEF DESCRIPTION OF THE DRAWINGS

Specific embodiments of the invention are now described with reference to the accompanying drawings; wherein FIG. 1 illustrate one form of prior art valve assembly.

DESCRIPTION OF THE PREFERRED EMBODIMENT

Figure 1:
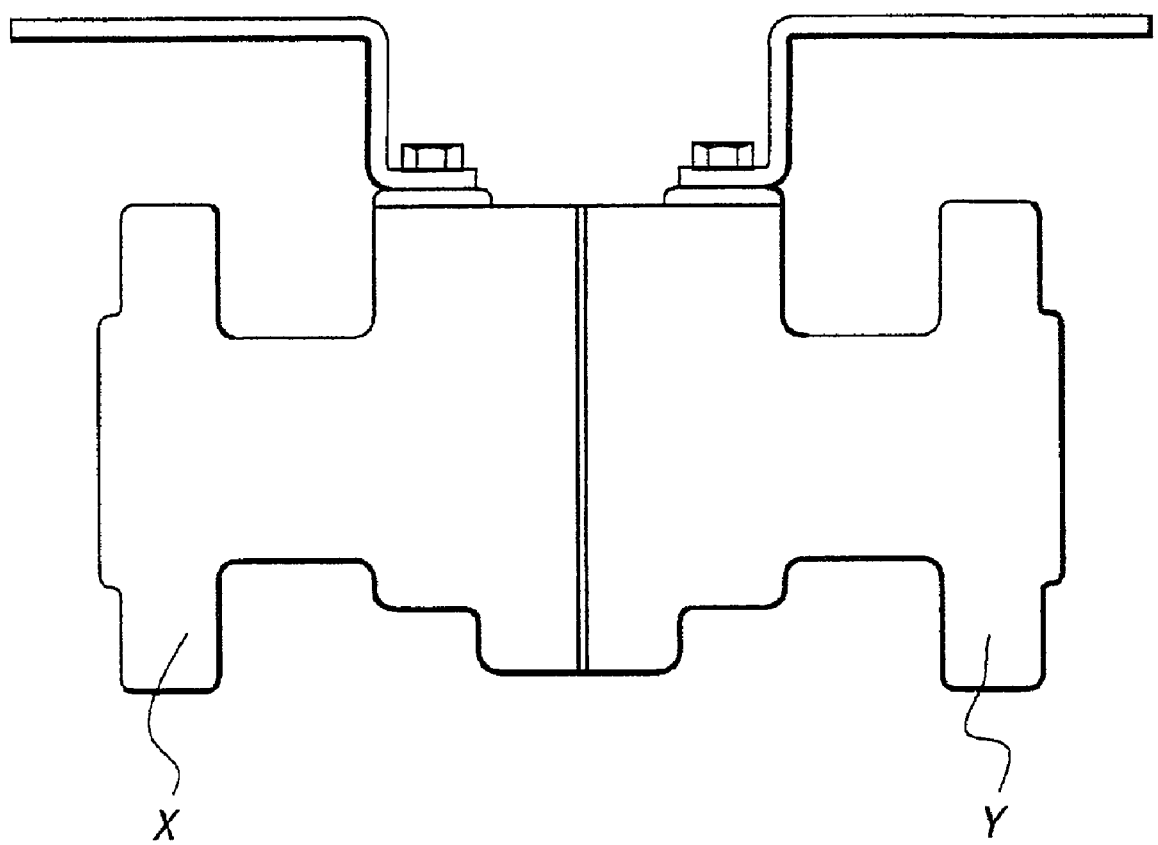
Figure 2:
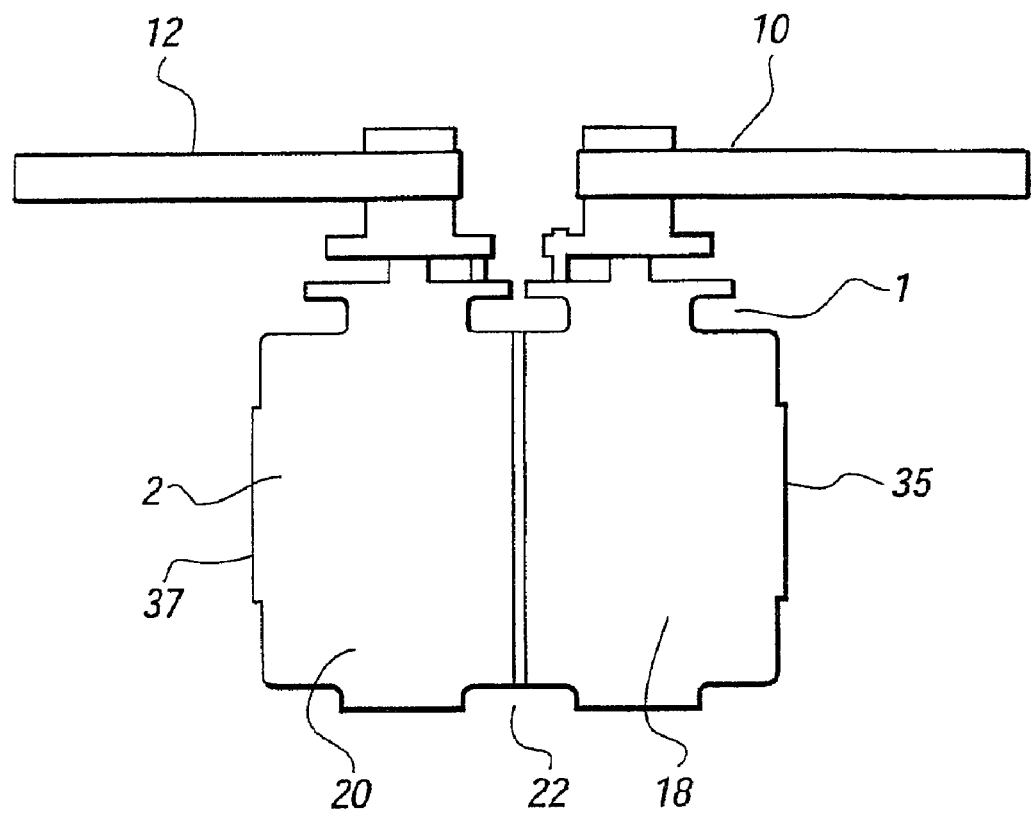
FIG. 2 illustrates an elevation of a valve in accordance with one embodiment of the invention.
Figure 3:
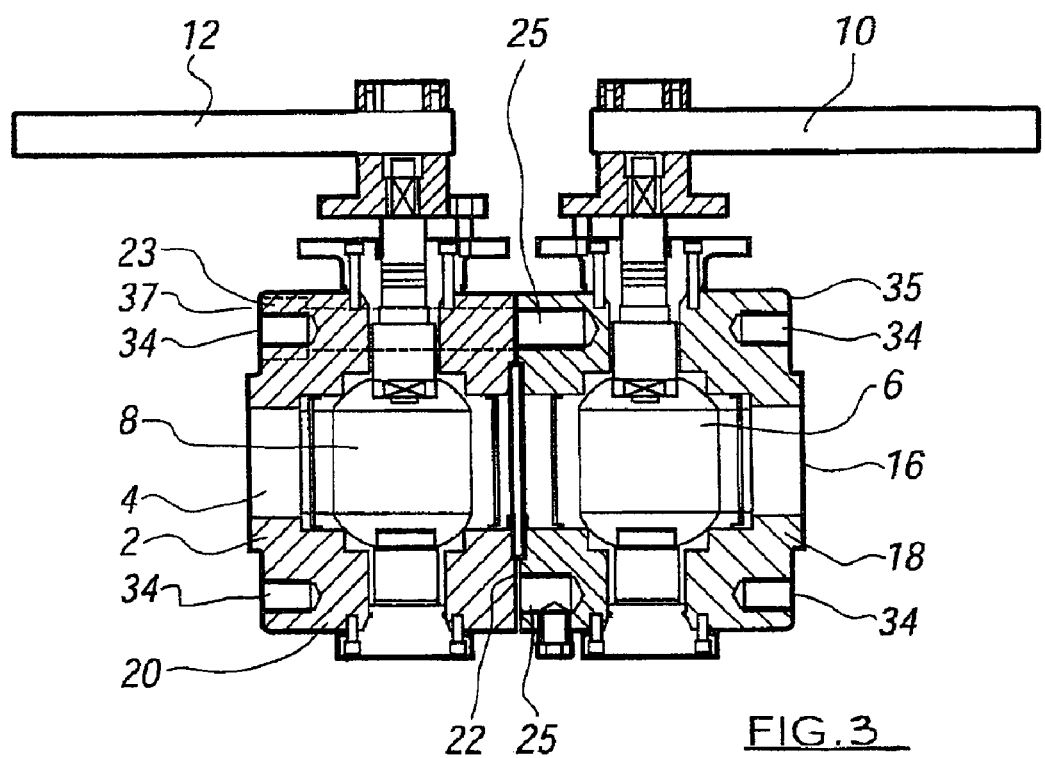
FIG. 3 illustrates a sectional elevation of the valve of FIG. 2 through the vertical centre line of FIG. 2.

Referring to FIGS. 1 2 and 3 there is shown one embodiment of a double block and bleed valve assembly 1 in accordance with the invention. The assembly comprises a valve body 2 which in accordance with this embodiment of the invention extends along the length of the valve assembly. The valve body includes a bore 4 which passes along the length of the body and which allows the selective flow of a liquid or gas therealong. The bore also includes two inline block valves 6, 8, each operable automatically and/or in this case via handles 10, 12 respectively. The valves typically include a ball, not shown, which is trunnion mounted and each valve is moveable between an open position to allow the fluid to pass therethrough, and a closed position. Also provided, in connection with the bore but mounted perpendicularly to the longitudinal axis 16 of the bore 4, is a bleed valve 17. This is not described in any detail here as it operates in a conventional manner.

Figure 4:
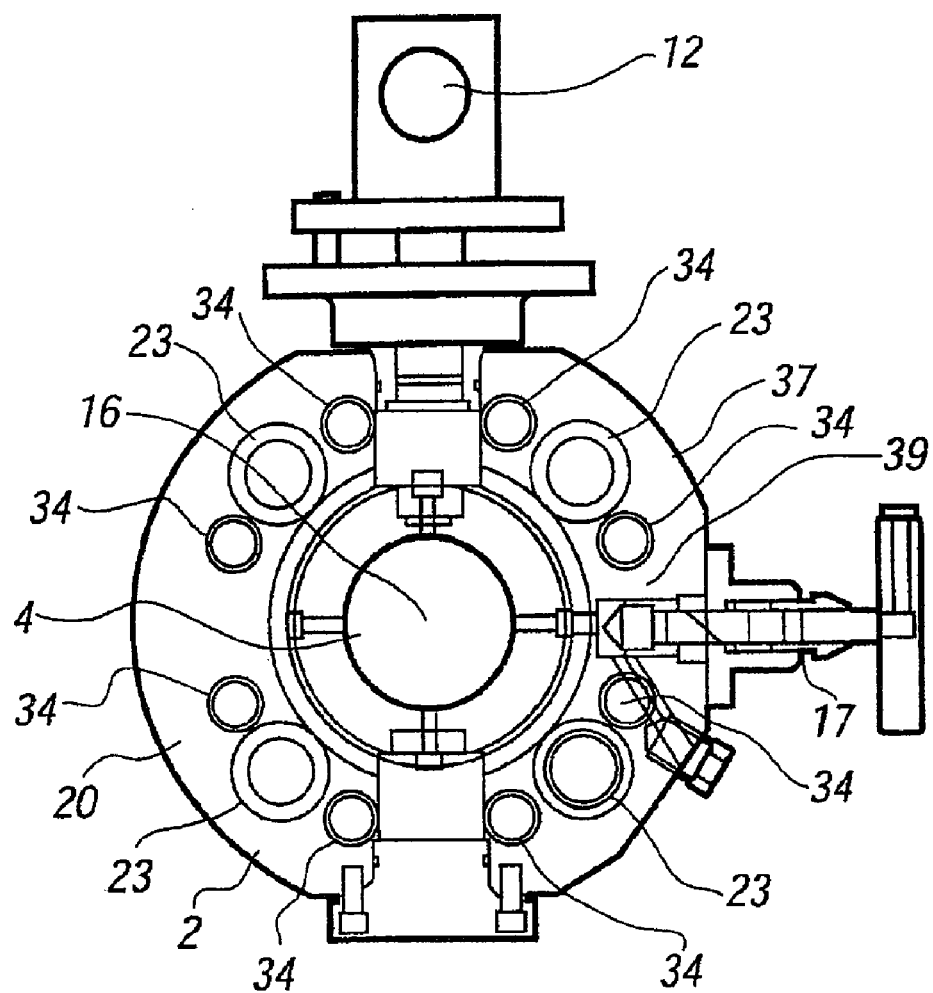
FIG. 4 illustrates a sectional end elevation of the valve assembly of FIGS. 2 and 3.

The valve body 2 comprises two parts 18, 20. The parts are joined together once the valve components have been positioned in the respective positions within the valve body parts. The two parts 18, 20 are then joined together at an interface 22, which is formed so as to minimize the opportunity for leakage of the liquid or gas from the bore through the interface join. The join is typically achieved via bolts located in a series of spaced channels 23, typically four, at the interface. The channels are located on the valve body part 20 in this embodiment and the bolts (not shown) pass along the channels, across the interface 22 and into threaded apertures 25 to engage the two parts 18, 20 together in a sealed relationship at the interface. FIG. 4 illustrates how the opening into the channels 23 are spaced in a circular path at the end face of the part 20.

Figure 5:
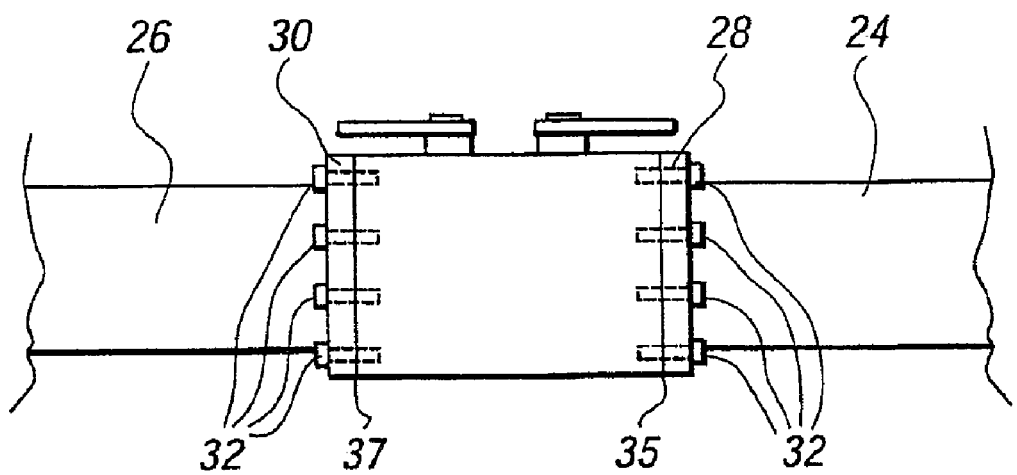
FIG. 5 illustrates a schematic illustration of the valve in accordance with the invention in use connected to a pipeline.

In accordance with the invention, and as illustrated in FIG. 5 the valve body does not include or require flange formations at each end face to be provided to allow connection of the valve with the pipeline flanges at the ends of the pipelines 24, 26. In accordance with the invention, the connection of the valve with the pipeline flanges 28, 30 is achieved via a series of bolts 32. Each of the bolts 32 passes through one of a series of spaced apertures in the pipeline flange and then into one of a number of threaded ports 34 at the respective end faces 35, 37 of the valve body. A series of the ports 34 are provided at each end 35, 37 of the valve body and they are spaced apart around a circular path 39 adjacent the peripheral edge of the end face. The number of ports and the spacing are provided to match those apertures provided as standard on the pipeline flanges 28, 30.

Thus, to secure the valve body in position with the pipeline flanges 28, 30, the valve is positioned in the space provided between the pipeline flanges 28, 30 and the ports 34 matched with the apertures on the flanges. With apertures and ports in line, bolts can be introduced from the pipeline ends, through the apertures in the pipeline flanges and into the ports in the valve body. The ports 34 are threaded and therefore the screwing in of the bolts serves to secure and tighten the pipeline flanges to the respective end faces of the valve body and seal the valve to the pipeline. As an alternative, headless threaded shafts can be inserted into the threaded ports in the valve body and nuts subsequently tightened onto the shafts from the pipeline ends, to secure and fasten the valve in position with the pipeline flanges.

The invention as herein described therefore provides a flangeless two part valve body which allows the advantages of assembly of a two part body, the advantages of the efficient seal between the two parts of the valve body to be combined with the direct connection of the valve body to the pipeline flanges, to be achieved in a valve which still meets the length and other requirements of ANSI 16.10. The lack of flanges means that there is greater space available in the valve body for the valve components to be provided and/or further components to be incorporated into the valve body which otherwise could not be accommodated in conventional valve bodies which include flanges due the length constraints on the valve.

The invention claimed is:

1. A valve assembly, said assembly comprising a valve body with ends having a bore running along the length thereof, said bore controlled between open and closed positions by two selectively operable valve arrangements positioned within the valve body, said body having a channel and an aperture with said body formed from at least first and second valve body parts, said parts joined at an interface intermediate the ends of the valve body, said valve body further including at least one end thereof with an end face and at least one port, said at least one port having an opening at said end face of the valve body and said port depending inwardly from the end face into the valve body for the reception of fastening means to allow the valve to be joined with a pipeline end at said end face wherein the valve body parts are joined at the interface to form the valve body by locating means passing along said channel in one of the body parts into said aperture in the other of said body parts.

2. An assembly according to claim 1 wherein said at least one port is located to lie within the valve body.

3. An assembly according to claim 1 wherein a series of spaced ports are provided at each end of said valve body.

4. An assembly according to claim 3 wherein the fastening means are a series of bolts, each to pass through a flange at the pipeline end and into said ports in the valve body.

5. An assembly according to claim 1 wherein the interface lies substantially perpendicular to the longitudinal axis of the bore passing through the valve body.

6. An assembly according to claim 1 wherein said valve body has spaced ports and channels, said ports are spaced and/or located at the end of the valve body such that said ports are offset with respect to said channels which receive said fastening means for attaching the valve body parts together at the interface.

7. An assembly according to claim 1 wherein a bleed valve is mounted on one of the two parts of the valve body.

8. An assembly according to claim 1 wherein eight ports are provided at each end of the valve body to allow the valve body to be connected to the adjacent flange of a pipeline.

9. An assembly according to claim 1 wherein the valve body has a length which complies with the required length in accordance with ANSI 16.10.

10. An assembly according to claim 1 wherein said valve body has an outer surface at and adjacent to the respective ends of said valve body and is free from any outwardly projecting formations.

11. A double block and bleed valve assembly for connection to first and second pipeline ends having a flange with an aperture, said valve assembly having a valve body with ends and spaced ports thereon, said pipeline ends provided with a flange with apertures at spaced locations for the reception of fastening means which pass through said apertures and into spaced ports provided in the respective ends of the valve body, said valve body having valve body parts with an interface and locating means, and wherein the valve body is of substantially the same outer surface dimensions along the length thereof, wherein the valve body parts have a channel and are joined at the interface to form the valve body by said locating means passing along said channel in one of the body parts into the other of said body parts.

12. A double block and bleed valve assembly for connection to a pipeline flange having apertures, said assembly comprising a valve body having a bore running along the length thereof, said bore movable between open and closed positions by two selectively operable valve arrangements positioned in line along the bore within the valve body, said valve body formed from first and second parts with locating means, said parts joined at an interface intermediate the ends of the valve body and wherein the valve body further includes at least one end thereof, an end face and spaced ports, said ports depending inwardly from the end face and provided for the reception of fastening means to pass through apertures provided on a pipeline flange and said ports located wholly within the valve body to allow the valve assembly to be directly joined with said pipeline via contact between the end face of the valve body and the pipeline flange wherein the valve body parts are joined at the interface to form the valve body by said locating means each passing along a channel in one of the body parts into an aperture in the other of said body parts.

13. A pipeline assembly incorporating a pipeline with pipeline ends and further with at least one double block and bleed valve assembly fitted thereto, said assembly comprising a valve body having a bore running along the length thereof, said valve body having end faces and further having valve body parts with an interface, locating means and a channel, said bore controlled between open and closed position by two selectively operable valve arrangements positioned along the bore to allow the selective flow of a fluid along the said pipeline and valve bore when the valve body is open, said valve body including at the end faces which are joined to the pipeline ends, spaced ports having openings at the end faces of the valve body and depending inwardly from the end faces into the valve body for the reception of locating bolts which pass through an aperture provided in a flange at the pipeline ends and into said ports in the valve body to allow the valve body to be joined with the pipeline ends and wherein the valve body parts are joined at the interface to form the valve body by said locating means passing along a channel in one of the body parts into the other of said body parts.

* * * * *